US009598617B2

(12) United States Patent
Lee et al.

(10) Patent No.: US 9,598,617 B2
(45) Date of Patent: *Mar. 21, 2017

(54) ACRYLATE BASED ADHESIVE COMPOSITION FOR OPTICAL USE, ACRYLATE BASED ADHESIVE SHEET FOR OPTICAL USE, AND METHOD FOR SEPARATING OPTICAL COMPONENT USING THE SAME

(71) Applicants: Samsung Display Co, Ltd., Yongin-si (KR); NITTA CORPORATION, Osaka-shi, Osaka (JP)

(72) Inventors: Dong-Sun Lee, Yongin-si (KR); Sang-Hyun Lim, Yongin-si (KR); Dae-Guen Choi, Yongin-si (KR); Hak-Sun Kim, Yongin-si (KR); Shinichiro Kawahara, Yamatokoriyama (JP); Minoru Nanchi, Yamatokoriyama (JP); Keisuke Sako, Yamatokoriyama (JP); Yuta Irie, Yamatokoriyama (JP); Satoshi Yamaguchi, Yamatokoriyama (JP)

(73) Assignees: Samsung Display Co., Ltd., Samsung-ro, Giheung-Gu, Yongin-si, Gyeonggi-Do (KR); NITTA CORPORATION, Naniwa-ku, Osaka-shi, Osaka (JP)

( * ) Notice: Subject to any disclaimer, the term of this patent is extended or adjusted under 35 U.S.C. 154(b) by 4 days.

This patent is subject to a terminal disclaimer.

(21) Appl. No.: 14/955,322

(22) Filed: Dec. 1, 2015

(65) Prior Publication Data

US 2016/0145474 A1 May 26, 2016

Related U.S. Application Data

(63) Continuation of application No. 13/605,027, filed on Sep. 6, 2012, now Pat. No. 9,221,231.

(30) Foreign Application Priority Data

Nov. 22, 2011 (KR) .................. 10-2011-0122296
Dec. 22, 2011 (JP) ................................ 2011-281022
Apr. 9, 2012 (KR) .................. 10-2012-0036806

(51) Int. Cl.
| | |
|---|---|
| *C09J 133/08* | (2006.01) |
| *C09J 133/10* | (2006.01) |
| *B32B 7/12* | (2006.01) |
| *B32B 27/30* | (2006.01) |
| *C09J 133/06* | (2006.01) |
| *C09J 133/12* | (2006.01) |
| *C09J 7/02* | (2006.01) |
| *B32B 7/06* | (2006.01) |
| *C09J 7/00* | (2006.01) |

(Continued)

(52) U.S. Cl.
CPC ............... *C09J 133/08* (2013.01); *B32B 7/06* (2013.01); *B32B 7/12* (2013.01); *B32B 27/308* (2013.01); *C08G 18/6229* (2013.01); *C09J 7/00* (2013.01); *C09J 7/02* (2013.01); *C09J 7/0217* (2013.01); *C09J 7/0225* (2013.01); *C09J 133/066* (2013.01); *C09J 133/10* (2013.01); *C09J 133/12* (2013.01); *C09J 175/04* (2013.01); *C09J 2201/36* (2013.01); *C09J 2203/318* (2013.01); *C09J 2433/00* (2013.01)

(58) Field of Classification Search
CPC .... C09J 133/06; C09J 133/066; C09J 133/08; C09J 133/10; C09J 133/12; C09J 133/14; C09J 7/00; C09J 7/02; C09J 7/0217; C09J 2201/36; C09J 2203/318; C09J 2203/322; B32B 27/308; B32B 7/06; B32B 7/12; B32B 9/045; B32B 2307/748; B32B 2333/08; B32B 2333/12
USPC .................. 428/355 EN, 355 AC, 515, 516; 525/330.3, 330.5; 526/328, 328.5; 156/332
See application file for complete search history.

(56) References Cited

U.S. PATENT DOCUMENTS 9,221,231 B2 * 12/2015 Lee .................... C08G 18/6229
2007/0166536 A1   7/2007 Dollase et al.
(Continued)

FOREIGN PATENT DOCUMENTS

CN        101003639 A     7/2007
CN        101428490 A     5/2009
(Continued)

OTHER PUBLICATIONS

Non-patent document dated Jul. 3, 2014 from http://www.oxforddictionaries.com/us/definition/american_english/sequential?q=sequentially#sequential_11 cited in the Final OA dated Jul. 10, 2014.

(Continued)

*Primary Examiner* — Roberto Rabago
(74) *Attorney, Agent, or Firm* — Robert E. Bushnell, Esq.

(57) ABSTRACT

Disclosed is an acrylate based adhesive composition for optical use that includes: a copolymer prepared by polymerizing an alkyl (meth)acrylate (wherein the alkyl is a C16 to C22 linear alkyl group) in an amount of about 1 to about 10 parts by weight, an alkyl (meth)acrylate (wherein the alkyl is a C1 to C12 alkyl group) in an amount of about 70 to about 98 parts by weight, and a polar monomer in an amount of about 1 to about 20 parts by weight; and a cross-linking agent. The cross-linking agent is included in an amount of about 0.5 to 5 parts by weight based on 100 parts by weight of the copolymer.

12 Claims, 2 Drawing Sheets

(51) Int. Cl.
  *C09J 175/04* (2006.01)
  *C08G 18/62* (2006.01)

(56) References Cited

U.S. PATENT DOCUMENTS

| | | | |
|---|---|---|---|
| 2009/0081452 A1 | 3/2009 | Husemann et al. | |
| 2010/0048077 A1 | 2/2010 | Ko et al. | |
| 2010/0313667 A1 | 12/2010 | Terada et al. | |

FOREIGN PATENT DOCUMENTS

| | | | |
|---|---|---|---|
| JP | 07-316515 A | | 12/1995 |
| JP | 10-060391 A | | 3/1998 |
| JP | 2002241732 A | | 8/2002 |
| JP | 2002361617 A | | 12/2002 |
| JP | 2003059871 A | | 2/2003 |
| JP | 2003238913 A | | 8/2003 |
| JP | 2004182936 A | | 7/2004 |
| JP | 2007099998 A | | 4/2007 |
| JP | 2007-131857 | * | 5/2007 |
| JP | 2007-131857 A | | 5/2007 |
| JP | 2008-308633 A | | 12/2008 |
| JP | 2011-37944 | * | 2/2011 |
| JP | 2011-37944 A | | 2/2011 |
| JP | 2011021049 A | | 2/2011 |
| JP | 2011-131857 A | | 7/2011 |
| KR | 10-2011-0045012 A | | 5/2011 |
| KR | 10-2011-0068888 A | | 6/2011 |
| WO | 2010137523 A1 | | 12/2010 |

OTHER PUBLICATIONS

Machine translation (JP 2011-131857, May 2007) cited in the Non-Final OA dated Dec. 4, 2013.

Machine translation (JP 2011-37944, Feb. 2011) cited in the Non-Final OA dated Dec. 4, 2013.

High transparent adhesive transfer tape from URL: http://www.mmm.co.jp/eas/oca printed on Sep. 6, 2012 and cited in the IDS filed on Sep. 6, 2012.

* cited by examiner

ACRYLATE BASED ADHESIVE COMPOSITION FOR OPTICAL USE, ACRYLATE BASED ADHESIVE SHEET FOR OPTICAL USE, AND METHOD FOR SEPARATING OPTICAL COMPONENT USING THE SAME

CROSS-REFERENCE TO RELATED APPLICATION

This application is a continuation under 35 U.S.C. §120 of U.S. application Ser. No. 13/605,027 filed on Sep. 6, 2012, the entire contents of which is herein incorporated by reference. All benefits under 35 U.S.C. §120 are claimed. This application claims priority to and the benefit of Korean Patent Application No. 10-2011-0122296 filed in the Korean Intellectual Property Office on Nov. 22, 2011, and 2011-281022 filed in the Japanese Intellectual Property Office on Dec. 22, 2011, and 10-2012-0036806 filed in the Korean Intellectual Property Office on Apr. 9, 2012, the entire contents of which are incorporated herein by reference.

BACKGROUND OF THE INVENTION

1. Field of the Invention

An acrylate based adhesive composition for optical use, an acrylate based adhesive sheet for optical use using the acrylate based adhesive composition for optical use, and a method for separating an optical component using the same are provided.

2. Description of the Related Art

An adhesive tape including adhesive layers made of an acrylate based adhesive and the like as a fixing member is used to fix various optical components in a process of manufacturing an image display device or a touch panel (for example, the highly transparent adhesive transfer tape manufactured by 3M. This fixing member requires optical characteristics such as transparency and the like or fixing properties of optical components.

In addition, optical components are relatively expensive and thus need to be separated and recycled, that is, reworked, when the optical components are mixed with foreign particles and wrongly positioned, and the like, and thus cause a defect in an image display device and the like. Accordingly, a fixing member for optical components should secure excellent reworkability of the optical components as well as the aforementioned optical characteristics or fixing properties.

SUMMARY

One exemplary embodiment of the present invention provides an acrylate based adhesive composition for optical use that has excellent reworkability of an optical component as well as excellent optical characteristics and fixing properties.

Another embodiment of the present invention provides an acrylate based adhesive sheet for optical use that is fabricated using the acrylate based adhesive composition for optical use.

According to still another embodiment of the present invention, a method of separating an optical component used in the acrylate based adhesive sheet for optical use is provided.

In one embodiment of the present invention, an acrylate based adhesive composition includes: a copolymer prepared by polymerizing monomers with a cross-linking agent, the monomers including: a first alkyl (meth)acrylate wherein the alkyl is a C16 to C22 linear alkyl group in an amount of about 1 to about 10 parts by weight based on 100 parts by weight of a total amount of the monomers; a second alkyl (meth)acrylate wherein the alkyl is a C1 to C12 alkyl group in an amount ranging from about 70 to about 98 parts by weight based on 100 parts by weight of the total amount of the monomers; and a polar monomer in an amount ranging from about 1 to about 20 parts by weight based on 100 parts by weight of the total amount of the monomers, wherein the cross-linking agent is included in an amount of about 0.5 to about 5 parts by weight based on 100 parts by weight of the copolymer.

The copolymer may have a weight average molecular weight of about 400,000 to about 1,000,000.

The polar monomer may be a hydroxyl group-containing ethylenic unsaturated monomer.

The cross-linking agent may be an isocyanate compound.

The first alkyl (meth)acrylate may be cetyl (meth)acrylate, stearyl (meth)acrylate, eicosyl (meth)acrylate) (eicosyl (meth)acrylate), behenyl (meth)acrylate or a mixture thereof; the second alkyl (meth)acrylate may be methyl (meth)acrylate, ethylhexyl (meth)acrylate, ethyl (meth)acrylate, butyl (meth)acrylate, hexyl (meth)acrylate or a mixture thereof; and the polar monomer may be acrylic acid, methacrylic acid, crotonic acid, itaconic acid, maleic acid, fumaric acid, 2-hydroxyethyl (meth)acrylate, 2-hydroxypropyl (meth)acrylate, 2-hydroxyhexyl (meth)acrylate or a mixture thereof.

According to another embodiment of the present invention, provided is an acrylate based adhesive sheet fabricated by laminating a plurality of adhesive layers having an acrylate based adhesive composition, the acrylate based adhesive composition including: a copolymer prepared by polymerizing monomers with a cross-linking agent, the monomers including: a first alkyl (meth)acrylate wherein the alkyl is a C16 to C22 linear alkyl group in an amount of about 1 to about 10 parts by weight based on 100 parts by weight of a total amount of the monomers; a second alkyl (meth)acrylate wherein the alkyl is a C1 to C12 alkyl group in an amount of 70 to 98 parts by weight based on 100 parts by weight of the total amount of the monomers; and a polar monomer in an amount of about 1 to about 20 parts by weight based on 100 parts by weight of the total amount of the monomers, wherein the copolymer and the cross-linking agent are included in a ratio of 100 parts by weight to about 0.5 to about 5 parts by weight.

The copolymer may have a weight average molecular weight of about 400,000 to about 1,000,000.

The polar monomer may be a hydroxyl group-containing ethylenic unsaturated monomer.

The cross-linking agent may be an isocyanate compound.

Each layer of a plurality of the adhesive layers may include the same kind and the same amount of the copolymers, which are cross-linked by the same kind and the same amount of the cross-linking agents.

The contact adhesive layers in a plurality of the adhesive layer may have 180 degree peeling strength of greater than or equal to about 5 N/25 mm at an atmosphere temperature of about 23° C. and less than or equal to 0.5 N/25 mm at an atmosphere temperature of about 90° C.

In addition, a releasing film may be further laminated on one or both sides of the acrylate based adhesive sheet for optical use.

The number of the plurality of the adhesive layers may be in a range of 2 to 6.

According to another embodiment of the present invention, provided is a method of fixing and separating an optical component, which includes fixing an optical component on both sides of an acrylate based adhesive sheet for optical use, and separating the optical component between contacting adhesive layers in a plurality of the adhesive layers included in the acrylate based adhesive sheet for optical use after deteriorating adhesive strength of the acrylate based adhesive sheet for optical use using heating equipment to increase the atmosphere temperature up to higher than or equal to 70° C.

In the method of separating an optical component, the acrylate based adhesive sheet for optical use may have reduced adhesive strength when its atmosphere temperature is increased up to higher than or equal to about 70° C. and then a peeling point is formed among a plurality of the adhesive layers included in the acrylate based adhesive sheet for optical use for separating the optical component.

When the acrylate based adhesive composition for optical use is used to form an acrylate based adhesive sheet for optical use, the acrylate based adhesive sheet may have sufficiently reduced adhesive strength by heating and thus decreases a load applied on an optical component during the separation and suppresses damage to the optical component. Accordingly, the optical component may be reworked. In addition, when the optical component is separated among the adhesive layers, the adhesive layer is left on the surface of the optical component and may protect the surface of the optical component and suppress damage to the optical component. Thus, the optical component may be reworked. Furthermore, the acrylate based adhesive sheet may have high adhesive strength and keep fixing the optical component with high reliability and thus secure both fixing reliability and reworkability. In addition, the acrylate based adhesive sheet may have excellent transparency, optical characteristics, and the like.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2A shows a method of separating an optical component which includes separating a first optical component and a second optical component, which are fixed together through an acrylate based adhesive sheet. FIG. 2B shows a first optical component and a second optical component respectively separated by peeling at near 90 degrees.

DETAILED DESCRIPTION

Figure 1:
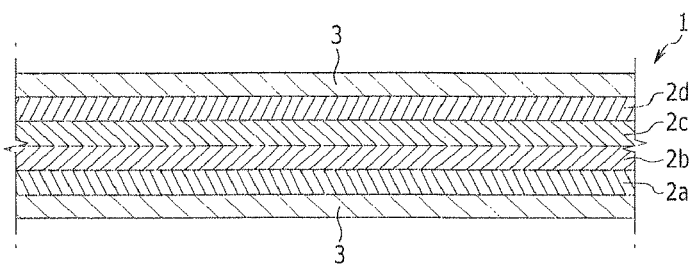
FIG. 1 is a cross-sectional view showing an acrylate based adhesive sheet for optical use according to one embodiment of the present invention.

<Acrylate Based Adhesive Composition for Optical Use>

According to one embodiment of the present invention, an acrylate based adhesive composition for optical use is provided.

The acrylate based adhesive composition for optical use is used as an adhesive that adheres or bonds optical components. The optical component may include, for example, an optical film such as a polarization film (a polarizer) used for an image display device such as a liquid crystal display (LCD), an organic light emitting device, a plasma display, and the like, a phase difference film and the like, a glass plate for a liquid crystal cell, a touch panel, and the like, but is not limited thereto. The adhesive may be appropriately used for an optical component that is fixed when there is no defect, but is separated for rework when there is a defect in the optical component. The acrylate based adhesive composition for optical use has excellent fixing reliability at room temperature but may have reduced adhesive strength at a high temperature, so that an optical component may be reworked. In addition, the acrylate based adhesive composition for optical use has excellent optical characteristics such as transparency and the like.

In the specification and the claims, the term "alkyl (meth)acrylate" is defined as including alkyl methacrylate and alkyl acrylate. For example, the behenyl (meth)acrylate can be behenyl methacrylate as well as behenyl methacrylate.

The acrylate based adhesive composition for optical use includes a copolymer obtained by polymerizing about 1 to about 10 parts by weight of an alkyl (meth)acrylate wherein the alkyl is a C16 to C22 linear alkyl group (hereinafter "first alkyl (meth)acrylate"); about 70 to about 98 parts by weight of an alkyl (meth)acrylate wherein the alkyl is a C1 to C12 alkyl group (hereinafter "second alkyl (meth)acrylate"); and about 1 to about 20 parts by weight of a polar monomer, and a cross-linking agent. The above-described amounts of the first alkyl (meth)acrylate, the second alkyl (meth)acrylate and the polar monomer are based on the total amount of the first alkyl (meth)acrylate, the second alkyl (meth)acrylate and the polar monomer.

The alkyl (meth)acrylate (wherein the alkyl is a C16 to C22 linear alkyl group) may include, for example, cetyl (meth)acrylate, stearyl (meth)acrylate, eicosyl (meth)acrylate) (eicosyl (meth)acrylate), behenyl (meth)acrylate, and the like, which may be used singularly or as a mixture of two or more thereof.

The alkyl (meth)acrylate (wherein the alkyl is a C1 to C12 alkyl group) may include, for example, methyl (meth)acrylate, ethylhexyl (meth)acrylate, ethyl (meth)acrylate, butyl (meth)acrylate, hexyl (meth)acrylate, and the like, which may be used singularly or as a mixture of two or more. The C1 to C12 alkyl group may be linear or branched.

The polar monomer is a cross-linking component and may include, for example, a carboxyl group-containing ethylenic unsaturated monomer such as acrylic acid, methacrylic acid, crotonic acid, itaconic acid, maleic acid, fumaric acid, and the like; a hydroxyl group-containing ethylenic unsaturated monomer such as 2-hydroxyethyl (meth)acrylate, 2-hydroxypropyl (meth)acrylate, 2-hydroxyhexyl (meth)acrylate, and the like; and the like, which may be used singularly or as a mixture of two or more thereof.

The monomers are polymerized in a ratio of about 1 to about 10 parts by weight of an alkyl (meth)acrylate (wherein the alkyl is a C16 to C22 linear alkyl group); about 70 to about 98 parts by weight of an alkyl (meth)acrylate (wherein the alkyl is a C1 to C12 alkyl group); and about 1 to about 20 parts by weight of a polar monomer. When the alkyl (meth)acrylate (wherein the alkyl is a C16 to C22 linear alkyl group) is included within the range, it applies appropriate adhesive strength for reworkability at 90° C. and appropriate adhesive strength at 23° C., while maintaining optical characteristics such as transparency and the like.

A method for preparing the copolymer is not limited to a particular method. The method may be, for example, solution polymerization, massive polymerization, suspension polymerization, emulsion polymerization, and the like. For example, as for the solution polymerization method, the monomers are added to a solvent, and the solution is agitated. The polymerization is performed at a temperature ranging from about 40 to about 90° C. for about 4 to about 8 hours.

The copolymer may have a weight average molecular weight of about 400,000 to about 1,000,000, specifically, about 500,000 to about 900,000, and more specifically, about 550,000 to about 900,000. When the copolymer has a weight average molecular weight within the range of about 400,000 to about 1,000,000, vapor generation is suppressed at the interface between the adhesive and the optical component when exposed to high temperature and high humidity at an atmosphere temperature ranging from about 80 to about 90° C. and humidity ranging from about 80 to about 90% RH, so that fixing reliability may be improved. In addition, a copolymer having a weight average molecular weight within the range of about 400,000 to about 1,000,000 may have appropriate viscosity and secure easy handling, and thus accomplish appropriate productivity. The weight average molecular weight is a polystyrene equivalent molecular weight obtained by converting a resultant value obtained by measuring a copolymer through gel permeation chromatography (hereinafter, referred to as "GPC").

The cross-linking agent cross-links the copolymer and may include, for example, an isocyanate compound, an aziridine compound, an epoxy compound, a metal chelate compound, and the like, which may be used singularly or as a mixture of more than one or two thereof. When the optical component is easy corrupt, the cross-linking agent may include an isocyanate compound, using a hydroxyl group-containing ethylenic unsaturated monomer as the polar monomer. Accordingly, the optical component may be suppressed from corruption.

The cross-linking agent may be included in an amount of about 0.5 to about 5 parts by weight in terms of a solid content, specifically, about 1 to about 4 parts by weight, and more specifically, about 1 to 3 parts by weight based on 100 parts by weight of the copolymer. When the cross-linking agent is included within the range, the cross-linking agent may apply adhesive strength for reworkability at 90° C. and appropriate adhesive strength at 23° C., and furthermore, it may apply appropriate fixing reliability under the aforementioned high temperature and high humidity atmosphere.

In the acrylate based adhesive composition for optical use, the copolymer is cross-linked by the cross-linking agent, forming an adhesive layer.

For example, the cross-linking of the copolymer using a cross-linking agent may be processed as follows. First, the aforementioned monomers are polymerized into the copolymer, and a solvent is added to the copolymer to prepare a copolymer solution. Next, a cross-linking agent is added to the copolymer solution, and the mixture is heated and dried to cross-link the copolymer. The heating and drying is performed under a temperature ranging from about 80 to about 150° C. for about 1 minute to about 20 minutes.

How the acrylate based adhesive composition prepared by cross-linking the copolymer is applied is not particularly limited. For example, the copolymer solution including a cross-linking agent may be directly coated on an optical component, and the coated optical component may be dried. Alternatively, the acrylate based adhesive composition may be used to form an adhesive tape other than an adhesive sheet described later. The adhesive tape is obtained by coating the copolymer solution including a cross-linking agent on one side or both sides of the substrate film, and then heating and drying it. Accordingly, an adhesive tape may be prepared to have an adhesive layer formed of the acrylate based adhesive composition on one side or both sides of a substrate film. The substrate film may have excellent optical characteristics.

<Acrylate Based Adhesive Sheet for Optical Use>

According to another embodiment of the present invention, an acrylate based adhesive sheet for optical use is provided by accumulating a plurality of the adhesive layers. The adhesive layers include a copolymer cross-linked by a cross-linking agent as aforementioned.

The "sheet" may not only include a sheet shape but also a film shape unless it damages effects of the present invention.

The acrylate based adhesive sheet for optical use will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts having no relationship with the description are omitted for clarity, and the same or similar constituent elements are indicated by the same reference numerals throughout the specification.

The size and thickness of each constituent element as shown in the drawings are randomly indicated for better understanding and ease of description, and the present invention is necessarily limited to as shown.

The size and thickness of each constituent element as shown in the drawings are exaggerated for better understanding and ease of description, and the present invention is not necessarily limited to as shown.

In the drawings, the thickness of layers, films, panels, regions, etc., are exaggerated for clarity. In the drawings, the thicknesses of some layers and regions are exaggerated for better understanding and ease of description. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As shown in FIG. 1, the acrylate based adhesive sheet 1 has a four-layered structure including adhesive layers 2a, 2b, 2c, and 2d, which are sequentially stacked.

The adhesive layers 2a, 2b, 2c, and 2d are formed of the acrylate based adhesive composition for optical use. In addition, the acrylate based adhesive sheet 1 may be fabricated by accumulating the cross-linked adhesive layers 2a, 2b, 2c, and 2d.

Specifically, the adhesive layers 2a, 2b, 2c, and 2d may be formed by coating an acrylate based adhesive composition for optical use and cross-linking it. Next, the cross-linked adhesive layers 2a, 2b, 2c, and 2d are sequentially accumulated and formed into the acrylate based adhesive sheet 1. The acrylate based adhesive composition for optical use may be coated using, for example, a knife coater, a roll coater, a calendar coater, a comma coater, and the like. In addition, the coating may be performed by using a gravure coater, a load coater, and the like depending on thickness.

According to an embodiment of the present invention, the acrylate based adhesive compositions for each adhesive layer 2a, 2b, 2c, and 2d may include the same kind and the same amount of the copolymer having the same weight average molecular weight, and the same kind and the same amount of the cross-linking agent. In other words, an acrylate based adhesive composition forming the adhesive layer 2a, an acrylate based adhesive composition forming an adhesive layer 2b, an acrylate based adhesive composition forming the adhesive layer 2c, and an acrylate based adhesive composition forming the adhesive layer 2d include the copolymer with the same composition and the same weight average molecular weight and the cross-linking agent with the same composition in the same amount. In this way, each adhesive layer includes the same components in the same amount, thus much improving the optical characteristics. In addition, "the same" refers to being substantially equivalent in the specification.

The acrylate based adhesive sheet 1 in general has a thickness ranging from about 20 to about 240 μm. Particularly, when an optical component has protrusions and depressions on the surface, the acrylate based adhesive sheet 1 may have a thickness ranging from about 80 to 200 μm. Accordingly, protrusions and depressions on the surface may fix the optical component with high reliability. In addition, when the optical component has protrusions and depressions on the surface, the adhesive layers 2a, 2b, 2c, and 2d may each have a thickness ranging from about 20 to 100 μm and specifically about 30 to about 50 μm.

On the other hand, when the optical component has protrusions and depressions on the surface, the acrylate based adhesive sheet 1 may have a thickness ranging from about 20 to about 50 μm. Accordingly, the acrylate based adhesive sheet may maintain good optical characteristics and fix the optical component therein. In addition, when the optical component has no protrusions and depressions on the surface, the adhesive layers 2a, 2b, 2c, and 2d may have a thickness ranging from about 5 to about 25 μm, and specifically about 10 to about 25 μm.

The adhesive layers 2a, 2b, 2c, and 2d may have the same thickness. Herein, the acrylate based adhesive sheet 1 may be obtained by cutting a single adhesive sheet into pieces and bonding and accumulating the sheet pieces. In addition, the adhesive layer may be more efficiently manufactured with a lower cost. In addition, an adhesive sheet fabricated by accumulating the same single adhesive layers may be easily suppressed from having a non-uniform thickness or non-uniform cross-linking.

The adhesive layers 2a, 2b, 2c, and 2d may have the following 180 degree peeling strength between the contacting adhesive layers at each atmosphere temperature of 23° C. and 90° C. The adhesive layers may have 180 degree peeling strength of greater than or equal to about 5 N/25 mm at an atmosphere temperature of 23° C., and specifically, about 5.5 N/25 mm to about 56 N/25 mm. When a 180 degree peeling strength at an atmosphere temperature of 23° C. is too small, the adhesive sheet may lack adhesive strength and may not fix an optical component.

In addition, when the adhesive layers have 180 degree peeling strength of less than or equal to about 0.5 N/25 mm at atmosphere temperature of 90° C., specifically less than or equal to about 0.4 N/25 mm, and more specifically about 0.3 N/25 mm to about 0.1 N/25 mm. When a 180 degree peeling strength at an atmosphere temperature of 90° C. is too great, the adhesive sheet may deteriorate reworkability of an optical component.

When the acrylate based adhesive sheet 1 is laminated with a releasing film 3 on both sides thereof, the releasing film 3 may be peeled off therefrom. Accordingly, the releasing film 3 may protect both sides of the acrylate based adhesive sheet 1. The releasing film 3 may be formed by coating a release agent such as silicon or fluorine and the like on the surface of a film made of polyethylene terephthalate and the like. The releasing film 3 may be laminated on one side of the acrylate based adhesive sheet 1.

<Method of Separating Optical Component>

Figure 2A:
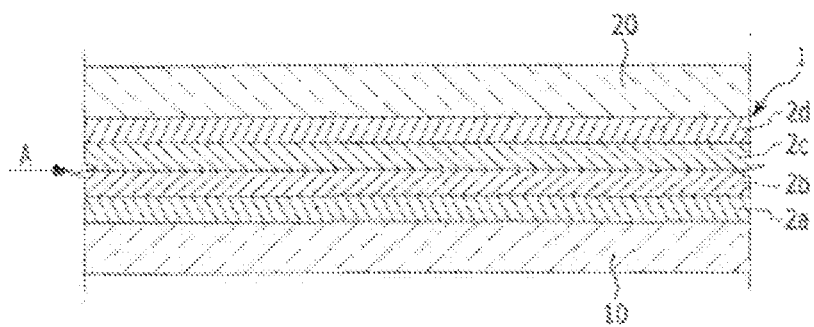
FIG. 2A and FIG. 2B schematically show a method of separating an optical component according to another embodiment of the present invention.

According to another embodiment of the present invention, a method of separating an optical component using the acrylate based adhesive sheet for optical use is provided. The method of separating an optical component is illustrated in detail referring to FIG. 2A and FIG. 2B. As shown in FIG. 2A, the method of separating an optical component includes separating a first optical component 10 and a second optical component 20, which are fixed together through the acrylate based adhesive sheet 1. According to the method for the optical components, the acrylate based adhesive sheet 1 may have adhesive strength that is sufficiently decreased by heating and thus have decreased strength of adhesion to the optical components 10 and 20, and the optical components 10 and 20 may be suppressed from being destroyed and may be reworked.

First of all, the acrylate based adhesive sheet 1 may have reduced adhesive strength by increasing an atmosphere temperature of greater than or equal to 70° C. and specifically, about 70 to about 90° C., using heating equipment. The heating equipment may include a heater and the like.

Figure 2B:
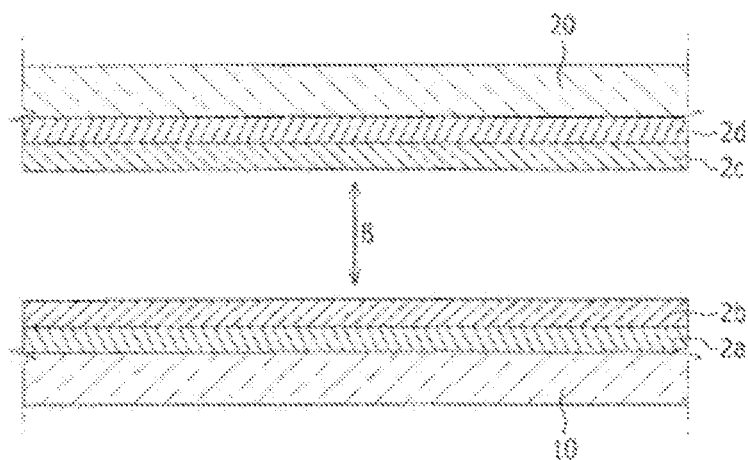

Then, the contacting adhesive layers 2b and 2c out of the adhesive layers 2a, 2b, 2c, and 2d are peeled apart, separating the first optical component 10 and the second optical component 20. Specifically, a peeling point (A) is formed by peeling apart one end of the interface of the adhesive layers 2b and 2c in a vertical direction. As described above, the adhesive layers 2b and 2c are laminated after the cross-linking and have appropriate strength. In addition, the adhesive strength of the adhesive layers 2b and 2c may be sufficiently reduced by the heating. Accordingly, the peeling point (A) allows the interface between the adhesive layers 2b and 2c to be easily delaminated. As a result, as shown in FIG. 2B, the first optical component 10 and the second optical component 20 may be respectively separated by peeling at near 90 degree (peeling by putting a force at 90 degree) shown in the direction of an arrow B. When the first optical component 10 and the second optical component 20 are respectively separated, the first optical component 10 and the second optical component 20 may have less load applied thereon and thus may be suppressed from being damaged and may be reworked.

In addition, the first optical component 10 and the second optical component 20 that are laminated with an adhesive layer on each surface are separated and thus may not be destroyed but may be reworked. Particularly, the first optical component 10 and the second optical component 20 are coated by the cross-linked adhesive layers on the surfaces and are effectively protected with the appropriate strength. On the other hand, the adhesive layers 2a and 2b coated on one surface of the first optical component 10 and the adhesive layers 2c and 2d coated on one surface of the second optical component 20 may be easily peeled or scratched off with a finger, and then the first optical component 10 and the second optical component 20 may be separated and reworked.

The peeling point (A) may be formed by using a jig like a thin spatula and the like to apply an external force between the adhesive layers 2b and 2c. In FIG. 2A, the peeling point (A) was formed between adhesive layers 2b and 2c, but the acrylate based adhesive sheet 1 formed by laminating four adhesive layers (2a, 2b, 2c, 2d) may have a peeling point (A) at a different position. For example, the peeling point (A) may be formed between the adhesive layers 2a and 2b or between the adhesive layers 2c and 2d. Since a plurality of adhesive layers (four layers in FIG. 2A) are accumulated into an acrylate based adhesive sheet 1, the peeling point A may be formed among more than one adhesive layer interface. Referring to the cross-section of the acrylate based adhesive sheet 1, the aforementioned jig may be more easily inserted into the acrylate based adhesive sheet 1 (i.e., including greater than or equal to three adhesive layers) having a plurality of peeling points (A) than the adhesive sheet (i.e., including greater than equal to two adhesive layers) having one peeling point (A), and thus may do less damage to the first optical component 10 and the second optical component 20 due to its external force.

Hereinbefore, exemplary embodiments of the present invention are illustrated, but the present invention is not limited thereto and will be explained by any embodiment within the scope of the present invention.

For example, the acrylate based adhesive sheet 1 according to one embodiment of the present may include four layers of adhesive layers 2a, 2b, 2c, and 2d, or may include two or more layers. The number of accumulated adhesive layers may be determined depending on optical components, and for example, may have 2 to 6 layers, but is not limited thereto.

The following synthesis examples and examples illustrate the present invention in more detail. These synthesis examples and examples, however, are not in any sense to be interpreted as limiting the scope of the present invention.

EXAMPLES

Synthesis Example 1

Five parts by weight of behenyl methacrylate, 35 parts by weight of ethylhexyl acrylate, 50 parts by weight of methyl acrylate, 10 parts by weight of 2-hydroxyethyl acrylate, and 0.2 parts by weight of tert-butyl peroxyneodecanoate ("perbutyl ND" made by NOF CORPORATION), and peroxide, as a radical initiator, were added to 230 parts by weight of ethyl acetate. The mixture was agitated at 55° C. for 6 hours to polymerize each monomer. The prepared copolymer had a weight average molecular weight of 650,000.

Synthesis Example 2

A copolymer was prepared by polymerizing each monomer according to the same method as Synthesis Example 1 except for using 5 parts by weight of cetyl methacrylate instead of 5 parts by weight of behenyl methacrylate. The copolymer had a weight average molecular weight of 700,000.

Synthesis Example 3

A copolymer was prepared according to the same method as Synthesis Example 1 except for using behenyl methacrylate in an amount of 8 parts by weight instead of 5 parts by weight, ethylhexyl acrylate in an amount of 40 parts by weight instead of 35 parts by weight, and 2-hydroxyethyl acrylate in an amount of 2 parts by weight instead of 10 parts by weight to polymerize each monomer. The copolymer had a weight average molecular weight of 550,000.

Synthesis Example 4

A copolymer was prepared according to the same method as Synthesis Example 1 except for performing the heat treatment at 65° C. instead of 55° C. to polymerize each monomer. The copolymer had a weight average molecular weight of 300,000.

Comparative Synthesis Example 1

A copolymer was prepared according to the same method as Synthesis Example 1 except for using not behenyl methacrylate but using ethylhexyl acrylate in an amount of 40 parts by weight instead of 35 parts by weight to polymerize each monomer. The prepared copolymer had a weight average molecular weight of 550,000.

Comparative Synthesis Example 2

A copolymer was prepared according to the same method as Synthesis Example 1 except for using behenyl methacrylate in an amount of 15 parts by weight instead of 5 parts by weight and ethylhexyl acrylate in an amount of 25 parts by weight instead of 35 parts by weight to polymerizing each monomer. The copolymer had a weight average molecular weight of 700,000.

Each copolymer according to Synthesis Examples 1 to 4 and Comparative Synthesis Examples 1 and 2 are provided in the following Table 1. In addition, the weight average molecular weights of the copolymers were calculated by converting the measurements obtained using GPC, to be polystyrene equivalent molecular weights.

TABLE 1

| | Monomers | | Weight average molecular weight |
|---|---|---|---|
| | composition[1] | Ratio (parts by weight) | |
| Synthesis Example1 | VMA/EHA/C1A/HEA | 5/35/50/10 | 650000 |
| Synthesis Example2 | CMA/EHA/C1A/HEA | 5/35/50/10 | 700000 |
| Synthesis Example3 | VMA/EHA/C1A/HEA | 8/40/50/2 | 550000 |
| Synthesis Example4 | VMA/EHA/C1A/HEA | 5/35/50/10 | 300000 |
| Comparative Synthesis Example1 | EHA/C1A/HEA | 40/50/10 | 550000 |
| Comparative Synthesis Example2 | VMA/EHA/C1A/HEA | 15/25/50/10 | 700000 |

[1]VMA: behenyl methacrylate, EHA: ethylhexyl acrylate, C1A: methyl acrylate, HEA: 2-hydroxylethyl acrylate, CMA: cetyl methacrylate Examples 1 to 4 and Comparative Examples 1 to 4

<Fabrication of Adhesive Sheet>

An acrylate based adhesive composition for optical use having the composition provided in the following Table 2 was formed into an acrylate based adhesive sheet for optical use. First of all, the copolymers according to Synthesis Examples 1 to 4 and Comparative Synthesis Examples 1 and 2 were adjusted to prepare a copolymer solution including 30 wt % of a solid using ethyl acetate. Next, a cross-linking agent was added to the copolymer solution in a ratio provided in the following Table 2 based on 100 parts by weight of the copolymer solution based on a solid content, preparing an acrylate based adhesive composition coating solution for optical use. The cross-linking agent was an isocyanate compound "Coronate L-45E" made by Nippon Polyurethane Industry Co. Ltd.

The acrylate based adhesive composition coating solution for optical use was formed into a double-layered acrylate based adhesive sheet for optical use and a four-layered acrylate based adhesive sheet for optical use. Specifically, the double-layered acrylate based adhesive sheet for optical use was formed to be 40 μm-thick by coating the acrylate based adhesive composition coating solution for optical use on a 50 μm-thick polyethylene terephthalate film and heating it at 100° C. for 10 minutes for a cross-linking reaction. Then, the single adhesive layer was cut into two pieces, and the two adhesive layers were bonded and accumulated together, obtaining an 80 μm-thick double-layered acrylate based adhesive sheet for optical use, of which both sides were laminated with a polyethylene terephthalate film.

On the other hand, the four-layered adhesive sheet was formed by first coating an adhesive coating solution on a releasing film. The releasing film was formed by coating silicon on the surface of a polyethylene terephthalate film and 50 μm thick. Next, the coated film was heated at 100° C. for 10 minutes for a cross-linking reaction, fabricating a 40 μm-thick adhesive layer. Then, the single adhesive layer was cut into four pieces, and the four adhesive layers were bonded and sequentially accumulated together, obtaining a 160 μm-thick four-layered acrylate based adhesive sheet for optical use.

The double-layered and four-layered acrylate based adhesive sheets for optical use had a plurality of adhesive layers and thus the same composition of a copolymer, the same weight average molecular weight, and the same composition and the same amount of a cross-linking agent. In addition, each adhesive layer had the same thickness.

<Evaluation>

The obtained adhesive sheets were evaluated regarding 180 degree peeling strength, reworkability, fixing reliability, and optical characteristics. Hereinafter, each evaluation is illustrated, and the results are provided in Table 2.

(Evaluation of 180 Degree Peeling Strength)

The double-layered acrylate based adhesive sheet for optical use was evaluated regarding 180 degree peeling strength between the adhesive layers contacting each other. Specifically illustrating, the 180 degree peeling strength of the double-layered acrylate based adhesive sheet for optical use was evaluated by setting an atmosphere temperature in a range of 23° C. and 90° C. and being maintained at each atmosphere temperature for 20 minutes according to JIS Z0237. The 180 degree peeling was performed by applying tension on the polyethylene terephthalate films on both sides of the adhesive sheet at a speed of 300 mm/min using a load cell.

(Reworkability)

The reworkability was evaluated from the 180 degree peeling strength at an atmosphere temperature of 90° C. The evaluation references are as follows.

○: 180 degree peeling strength is less than or equal to 0.5 N/25 mm at an atmosphere temperature of 90° C.

Δ: 180 degree peeling strength is greater than or equal to 0.5 N/25 mm and less than or equal to 1 N/25 mm at an atmosphere temperature of 90° C.

x: 180 degree peeling strength is greater than or equal to 1 N/25 mm at an atmosphere temperature of 90° C.

(Fixing Reliability)

The four-layered acrylate based adhesive sheet for optical use was evaluated regarding fixing reliability. Specifically, a 100 μm-thick polyethylene terephthalate film was accumulated on a glass plate. Next, a 100 μm-thick polarizing film was fixed through the four-layered adhesive sheet on the polyethyleneterephthalate film at an atmosphere temperature of 23° C., fabricating a specimen.

The specimen was exposed to high temperature and high humidity atmosphere of 85° C. and 85% RH for 256 hours. After 256 hours, the specimen was examined with bare eyes from the direction of the polarization film and evaluated regarding fixing reliability. The evaluation references are as follows, ○: No vapor was generated in the specimen.

Δ: A small amount of vapor was generated in the specimen.

x: A large amount of vapor was generated in the specimen.

(Optical Characteristics)

The double-layered and four-layered acrylate based adhesive sheets for optical use were examined with bare eyes to evaluate optical characteristics. The evaluation references are as follows.

○: Both the double-layered and 4-layered adhesive sheets are respectively transparent.

x: At least either of the double-layered adhesive sheet or the 4-layered adhesive sheet is opaque.

TABLE 2

|  | Composition (parts by weight)[1] and weight average molecular weight | Cross-linking agent (parts by weight) | 180 degree peel strength (N/25 mm) | | Reworkability | Fixing reliability[2] | Optical characteristic |
| --- | --- | --- | --- | --- | --- | --- | --- |
|  |  |  | 23° C. | 90° C. |  |  |  |
| Example 1 | Synthesis Example 1 VMA/EHA/C1A/HEA = 5/35/50/10 weight average molecular weight: 650,000 | 3 | 6.5 | 0.3 | ○ | ○ | ○ |
| Example 2 | Synthesis Example 2 CMA/EHA/C1A/HEA = 5/35/50/10 weight average molecular weight: 700000 | 3 | 7 | 0.3 | ○ | ○ | ○ |
| Example 3 | Synthesis Example 3 VMA/EHA/C1A/HEA = 8/40/50/2 weight average molecular weight: 550,000 | 3 | 5.5 | 0.2 | ○ | ○ | ○ |

TABLE 2-continued

| | Composition (parts by weight)[1] and weight average molecular weight | Cross-linking agent (parts by weight) | 180 degree peel strength (N/25 mm) 23° C. | 180 degree peel strength (N/25 mm) 90° C. | Reworkability | Fixing reliability[2] | Optical characteristic |
|---|---|---|---|---|---|---|---|
| Example 4 | Synthesis Example 4 VMA/EHA/C1A/HEA = 5/35/50/10 weight average molecular weight: 300000 | 3 | 7 | 0.4 | ○ | Δ | ○ |
| Comparative Example 1 | Comparative Synthesis Example 1 EHA/C1A/HEA = 40/50/10 weight average molecular weight: 550,000 | 3 | 8 | 1.5 | x | ○ | ○ |
| Comparative Example 2 | Comparative Synthesis Example 2 VMA/EHA/C1A/HEA = 15/25/50/10 weight average molecular weight: 700,000 | 3 | 4.5 | 0.2 | ○ | ○ | x |
| Comparative Example 3 | Synthesis Example 1 VMA/EHA/C1A/HEA = 5/35/50/10 weight average molecular weight: 650000 | 0.2 | 9.5 | 0.8 | Δ | x | ○ |
| Comparative Example 4 | Synthesis Example 1 VMA/EHA/C1A/HEA = 5/35/50/10 weight average molecular weight: 650,000 | 7 | 3.5 | 0.2 | ○ | ○ | ○ |

[1]VMA: behenyl methacrylate, EHA: ethylhexyl acrylate, C1A: methyl acrylate, HEA: 2-hydroxylethyl acrylate, CMA: cetyl methacrylate
[2]85° C. x 85% RH x 256 hours Referring to Table 2, the specimens according to Examples 1 to 4 had 180 degree peeling strength of greater than or equal to 5 N/25 mm between the adhesive layers at an atmosphere temperature of 23° C., and thus high adhesive strength, and 180 degree peeling strength between the adhesive layers of less than or equal to 0.5 N/25 mm at an atmosphere temperature of 90° C., and thus excellent reworkability and excellent optical characteristics. Particularly, the specimens made of a copolymer with a weight average molecular weight ranging from 400,000 to 1,000,000 according to Examples 1 to 3 had excellent fixing reliability.

On the other hand, the specimen including unpolymerized (meth)acrylate with a C16 to C22 linear alkyl group according to Comparative Example 1 had 180 degree peeling strength between the adhesive layers of greater than or equal to 0.5 N/25 mm at an atmosphere temperature of 90° C., and thus deteriorated reworkability. In addition, the specimen including (meth)acrylate having a C16 to C22 linear alkyl group and polymerized in a ratio of more than 10 parts by weight according to Comparative Example 2 had 180 degree peeling strength of less than 5 N/25 mm between the adhesive layers at an atmosphere temperature of 23° C. and thus reduced adhesive strength and deteriorated optical characteristics.

The specimen including a cross-linking agent in an amount of less than 0.5 parts by weight according to Comparative Example 3 had 180 degree peeling strength between the adhesive layers of higher than 0.5 N/25 mm at an atmosphere temperature of 90° C. and thus deteriorated reworkability and deteriorated fixing reliability. The specimen including a cross-linking agent in an amount of more than 5 parts by weight according to Comparative Example 4 had 180 degree peeling strength between the adhesive layers of lower than 5 N/25 mm at an atmosphere temperature of 23° C. and thus reduced adhesive strength.

while this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An acrylate based adhesive sheet fabricated by sequentially accumulating a plurality of adhesive layers comprised of an acrylate based adhesive composition, the acrylate based adhesive composition comprising:
   a copolymer prepared by polymerizing monomers and then cross linking with a cross-linking agent,
   the monomers comprising:
   a first alkyl (meth)acrylate wherein the alkyl is a C16 to C22 linear alkyl group in an amount of about 1 to about 10 parts by weight based on 100 parts by weight of a total amount of the monomers;
   a second alkyl (meth)acrylate wherein the alkyl is a C1 to C12 alkyl group in an amount of 70 to 98 parts by weight based on 100 parts by weight of the total amount of the monomers; and a polar monomer in an amount of about 1 to about 20 parts by weight based on 100 parts by weight of the total amount of the monomers, wherein the copolymer and the cross-linking agent are comprised present in a ratio of 100 parts by weight to about 0.5 to about 5 parts by weight, wherein 180 degree peeling strength between the adhesive layers contacting each other is less than or equal to about 0.5 N/25 mm at an atmospheric temperature of about 90° C.

2. The acrylate based adhesive sheet of claim 1, wherein the copolymer has a weight average molecular weight ranging from about 400,000 to about 1,000,000.

3. The acrylate based adhesive sheet of claim 1, wherein the polar monomer is a hydroxyl group-containing ethylenic unsaturated monomer.

4. The acrylate based adhesive sheet of claim 1, wherein the cross-linking agent is an isocyanate compound.

5. The acrylate based adhesive sheet of claim 1, wherein each layer of the plurality of adhesive layers comprises the same kind and the same amount of the copolymers, which are cross-linked by the same kind and the same amount of the cross-linking agents.

6. The acrylate based adhesive sheet of claim 1, wherein a releasing film is further laminated on one side or both sides thereof.

7. The acrylate based adhesive sheet of claim 1, wherein the number of the plurality of the adhesive layers is in a range of 2 to 6 layers.

8. The acrylate based adhesive sheet of claim 1, wherein the first alkyl (meth)acrylate comprises cetyl (meth)acrylate, stearyl (meth)acrylate, eicosyl (meth)acrylate, behenyl (meth)acrylate or a mixture thereof;

the second alkyl (meth)acrylate comprises methyl (meth)acrylate, ethylhexyl (meth)acrylate, ethyl (meth)acrylate, butyl (meth)acrylate, hexyl (meth)acrylate or a mixture thereof; and the polar monomer comprises acrylic acid, methacrylic acid, crotonic acid, itaconic acid, maleic acid, fumaric acid, 2-hydroxyethyl (meth)acrylate, 2-hydroxypropyl (meth)acrylate, 2-hydroxyhexyl (meth)acrylate or a mixture thereof.

9. The acrylate based adhesive sheet of claim 1, wherein the first alkyl (meth)acrylate comprises cetyl methacrylate or behenyl methacrylate;

the second alkyl (meth)acrylate comprises ethylhexyl acrylate and methyl acrylate; and the polar monomer comprises 2-hydroxyethyl acrylate.

10. A method of fixing and separating an optical component, comprising:

fixing an optical component on both sides of the acrylate based adhesive sheet for optical use according to claim 1; and separating the optical component by heating the acrylate based adhesive sheet to an atmosphere temperature of higher than or equal to about 70° C. to deteriorate its adhesive strength and peeling the adhesive layers contacting one another among a plurality of the adhesive layers.

11. The method of claim 10, wherein the optical component is separated by heating the acrylate based adhesive sheet up to or higher than an atmosphere temperature of about 70° C. to deteriorate its adhesive strength and then forming a peeling point among a plurality of the adhesive layers.

12. The method of claim 10, wherein the optical component is at least one selected from the group consisting of an optical film, a phase difference film, a glass plate for a liquid crystal cell and a touch panel.

* * * * *